United States Patent [19]
Abe

[11] Patent Number: 5,807,032
[45] Date of Patent: Sep. 15, 1998

[54] ROTARY CUTTING TOOL AND METHOD OF MANUFACTURING THE SAME

[75] Inventor: Makoto Abe, Itami, Japan

[73] Assignee: Sumitomo Electric Industries, Ltd., Osaka, Japan

[21] Appl. No.: 498,475

[22] Filed: Jul. 5, 1995

[30] Foreign Application Priority Data

| Jul. 6, 1994 | [JP] | Japan | 6-154469 |
| Jul. 19, 1994 | [JP] | Japan | 6-167017 |
| Apr. 25, 1995 | [JP] | Japan | 7-100903 |

[51] Int. Cl.$^6$ .................................................. B23C 5/18
[52] U.S. Cl. ......................... 407/118; 76/101.1; 407/54; 407/63; 407/119; 228/124.5
[58] Field of Search ............................... 407/32, 53, 118, 407/119, 63, 54; 76/102.1, 115, 101.1, DIG. 12; 228/124.5; 408/144, 145

[56] References Cited

U.S. PATENT DOCUMENTS

| 4,983,078 | 1/1991 | Unozawa | 407/34 |
| 5,020,394 | 6/1991 | Nakamuiza et al. | 407/118 |
| 5,049,009 | 9/1991 | Beck et al. | 407/63 |
| 5,115,697 | 5/1992 | Rodriguez et al. | 407/118 |
| 5,366,522 | 11/1994 | Nakamura et al. | 51/293 |
| 5,464,068 | 11/1995 | Najafi-Sani | 408/144 |

FOREIGN PATENT DOCUMENTS

| 0 316 105 | 5/1989 | European Pat. Off. . |
| 0 477 093 | 3/1992 | European Pat. Off. . |
| 1193210 | 10/1959 | France . |
| 623 640 | 12/1935 | Germany . |
| 23243 | 8/1913 | United Kingdom . |

OTHER PUBLICATIONS

Mears Handbook Ninth Ed., vol. 6, "Welding Brazing & Soldering", pp. 1061, 1063 (1983).

Patent Abstracts of Japan, vol. 13, No. 194 (M–823)(3542) May 10, 1989.

Patent Abstracts of Japan, vol. 16, No. 416 (M–1304) Sep. 2, 1992.

*Primary Examiner*—Steven C. Bishop
*Attorney, Agent, or Firm*—Wenderoth, Lind & Ponack, L.L.P.

[57] ABSTRACT

An insert made of an ultra-high-pressure sintered compact and including no base metal or support layer is brazed to a tool body under vacuum by use of a Ti-containing activated silver brazing filler metal. This method permits the insert to be securely fixed to the tool body without fear of the insert coming off the tool body even if the tool is a helical one. Because no base metal layer is needed, the manufacturing yield, efficiency and productivity are improved.

5 Claims, 5 Drawing Sheets

ROTARY CUTTING TOOL AND METHOD OF MANUFACTURING THE SAME

BACKGROUND OF THE INVENTION

The present invention relates to a rotary cutting tool having helical edges. The rotary cutting tool, such as a spiral end mill, a spiral reamer or a drill, includes helical inserts made from an ultra-high-pressure sintered compact. The present invention also relates to an insert made from an ultra-high-pressure sintered compact for use in the aforementioned tool, and a method of manufacturing such a tool and an insert at low cost.

A rotary cutting tool having helical edges having a large helix angle has an excellent cutting performance and can machine a workpiece with high precision because its teeth bite into the workpiece continuously, i.e. rear portions of the teeth can bite into the workpiece before their leading portions separate from the workpiece.

One problem with such a rotary cutting tool is that because of the large helix angle of its cutting edges, the material used for the cutting edge is limited to a cemented carbide, a high-speed steel, etc. that is lower in wear resistance than an ultra-high-pressure sintered compact. Such a rotary cutting tool cannot maintain its high machining precision for a sufficiently long period of use because the cutting edges tend to get worn very rapidly.

On the other hand, an ultra-high-pressure sintered compact formed by sintering a powder of diamond, high-pressure phase type boron nitride, or their mixture under ultra-high pressure has excellent wear resistance. But in order to form helical flutes from such ultra-high-pressure sintered compact, there remain many problems that have to be solved.

Namely, an ultra-high-pressure sintered compact is usually formed as a flat plate as shown in FIG. 3. The plate material 15 shown in FIG. 3 has a double-layer structure including a cemented carbide base layer 17 and an ultra-high-pressure sintered compact layer 16. The thickness of the compact 16 is usually limited so as to not exceed 1 mm. Because of this restriction of thickness, it is impossible to cut a helical insert having a helix angle of more than 5° out of this plate material 15. The cutting performance is low with such a helical insert because of its small helix angle.

Unexamined Japanese Patent Publication 3-277412 proposes one solution to this problem. It proposes to form helical grooves in a sintered compact substrate, fill the grooves with a material powder, and sinter the material powder under ultra-high pressure to anchor it to the sintered compact substrate.

Also, in an attempt to remove the restriction on the helix angle, the applicant of the present invention proposed in Unexamined Japanese Publication 3-10707 to form a columnar or cylindrical member by integrally forming a peripheral layer of a ultra-high-pressure sintered compact around a base metal as a core, and form helical surfaces that intersect the outer cylindrical surface of the member on both sides thereof by cutting it longitudinally.

Heretofore, no technique for bonding an insert of an ultra-high-pressure sintered compact to a tool body was available. Thus, most of such conventional inserts had a base metal which was adapted to be brazed to a tool body. A sintered compact of diamond or cubic boron nitride is low in wettability with a brazing filler metal equivalent to JIS BAg-3 which is usually used for brazing cemented carbides. It is thus impossible to braze an insert made of such a material to a tool body under atmospheric conditions. It was therefore an ordinary practice to form an insert from a sintered compact and a base metal layer of a cemented carbide fixed to the sintered compact, and braze the base metal layer to a tool body in the atmosphere.

The technique disclosed in Unexamined Japanese Patent Publication 3-277412 has an advantage in that it is not necessary to bond the insert to the tool body after sintering the insert because the sintered compact base itself is used as the tool body. Also, since the helix angle of the grooves can be determined freely, the lead angle of the cutting edge can be also freely determined But this technique has several problems. One problem is that the manufacturing efficiency of the inserts is low. Another problem is that a large part of the sintered compact base has to be removed when finishing it into the shape of a tool. This inevitably pushes up the machining cost. Also, this technique requires a rather long time for machining and thus the productivity is low.

On the other hand, by using the technique disclosed in Unexamined Japanese Patent Publication 3-10707, it is possible to cut or form as many helical inserts as those required for several tools out of a single columnar or cylindrical material. Also, since helical grooves and insert seats can be formed in the tool body before hardening or sintering, it is possible to minimize the amount of material removed after bonding the inserts.

But with the technique disclosed in this Publication, the manufacturing efficiency is still not sufficient because columnar members are formed one by one and only one helical insert can be cut from the member.

A material including a base metal layer tends to develop cracks in its ultra-high-pressure sintered compact due to the difference in thermal expansion coefficient between the base metal layer and the sintered compact layer. Cracks may also develop in the sintered compact when cutting a helical insert from the material including a base metal layer by electrical discharge machining. Thus, this technique is still unsatisfactory in the yield of materials as well as the yield of inserts cut from the material.

We therefore thought that these problems can be solved if the material for inserts includes no base metal layer. If we find a way to bond an insert of an ultra-high-pressure sintered compact, as disclosed in Unexamined Japanese Patent Publication 3-10707 without a base metal layer directly to a tool body, it will be possible to greatly reduce the tool manufacturing cost. Without base metals or support layers, it will be also possible to reduce the defective rate when forming materials for inserts and when cutting inserts from such insert material. This leads to further reduction in the manufacturing cost.

A first object of the present invention is to provide a method of bonding an insert of an ultra-high-pressure sintered compact, including no base metal layer to a tool body, and to provide a rotary cutting tool having helical inserts formed by this method and which is high in cutting ability, cutting accuracy and durability and less expensive.

The columnar sintered compact used in Unexamined Japanese Patent Publication 3-10707 has a double-layer structure comprising a base metal 13 of a cemented carbide, and a hard sintered compact 14 integrally formed around the base metal 13. Thus, one sintered compact can form only one insert material. This limits the number of inserts obtained from a single sintered compact.

Also, if the height of a columnar sintered body is larger than a certain level, it becomes difficult to transmit pressure to its inner portion, so that the density of the sintered body tends to be uneven. Thus, the upper limit of the ratio of the thickness t of the sintered body to its diameter d (FIG. 14), i.e. the ratio t/d is about ½ to ⅓. Another problem of the method disclosed in Unexamined Patent Publication 3-10107 is that since a helical insert is formed by cutting longitudinally the sintered compact (material for inserts) having a height t, the effective length of the cutting edge of the insert is limited by the height t. Namely, it is impossible to form an insert having a long cutting edge.

A second object of the present invention is to provide helical inserts of ultra-high-pressure sintered compact which are free of the abovementioned problems, and a method of manufacturing such inserts.

SUMMARY OF THE INVENTION

According to the present invention, there is provided a method of manufacturing a rotary cutting tool characterized in that inserts of an ultra-high-pressure sintered compact, which include no base metal layer, are secured to a tool body by brazing under vacuum using Ti-containing activated silver brazing filler metal.

In another method, inserts are secured to a tool body by forming a film coating of a Ti compound on the surface of the inserts, and then silver-brazing the inserts to the tool body in the atmosphere.

The rotary cutting tool thus formed has a bonding layer of Ti-containing activated silver brazing filler metal or a Ti compound film and a silver brazing filler metal disposed between the ultra-high-pressure sintered compact insert including no base metal and the tool body.

The helical insert of an ultra-high-pressure sintered compact according to the present invention has helical side faces formed by cutting a columnar or cylindrical member longitudinally along two helical planes. It is formed solely from an ultra-high-pressure sintered compact and includes no base metal layer.

The method of manufacturing helical inserts of an ultra-high-pressure sintered compact according to the present invention includes the steps of forming a plurality of cylindrical or columnar members by cutting a single block of an ultra-high-pressure sintered compact, and cutting each member longitudinally along helical planes to form inserts having helical side faces.

By brazing inserts of ultra-high-pressure sintered compact to a tool body under vacuum using Ti-containing activated silver as a brazing metal, they can be bonded strongly to the tool body.

By forming a coating of a Ti compound such as TiC, TiN or TiCN on the surface of inserts, the inserts can be bonded strongly to the tool body by brazing even in the atmosphere.

In this arrangement, the inserts are bonded so rigidly to the tool body that it is possible to prevent the inserts from dropping off when machining them to adjust their rake angle or clearance angle or while the tool is being used for actual cutting. Thus, the tool can be used safely.

Since the insert according to the present invention is formed solely from an ultra-high-pressure sintered compact and includes no base layer of cemented carbide, no stress resulting from a difference in thermal expansion coefficients will be produced in the insert, so that it is less likely to be broken or develop cracks. But it is usually very difficult to bond such an insert to a tool body by ordinary brazing. But we have found two ways to do this.

In the present invention, Ti-containing activated silver is used as a brazing metal. We examined various brazing metals and found that a metal having a composition of 60–80 wt % of Ag, 10–20 wt % of Cu and 0.5–10 wt % of Ti were the most desirable. Of the components in the brazing metal, Ti is the most important element. If the brazing metal contains no Ti or the Ti content is less than 0.5 wt %, the bond strength between the insert and the tool body will be insufficient. On the other hand, a brazing metal containing more than 10 wt % Ti is so high in melting point that it is difficult to use. Most preferably, the Ti content is within the range between 2 and 5 wt %. Within this range, helical inserts of ultra-high-pressure sintered compact can be bonded stably and strongly to the tool body.

If diamond and CBN are exposed to temperatures higher than 1000° C., they may deteriorate, or diamond may turn to graphite and CBN to hBN. In order to prevent such heat deterioration, the brazing temperature should be lower than about 900° C. The lower limit of the brazing temperature is determined by the melting point of the brazing metal used. The melting point can be lowered by adding low-melting point elements such as In and Sn to the brazing metal. But the lowest possible melting point would be about 700° C. at most. Brazing metals will not melt at temperatures below 700° C.

If such Ti-containing activated silver is used for brazing in the atmosphere, the effect of addition of Ti will not be expected. Namely, the content of Ti, which contributes to increase the bond strength between the tool body and an ultra-high-pressure sintered compact, will decrease because Ti reacts with oxygen and nitrogen in the air to such an extent that the bond strength decreases below the necessary level. Thus, brazing using Ti-containing activated silver as brazing metal should be carried out under vacuum. The degree of vacuum should be set slightly higher than that ordinarily employed in ordinary vacuum brazing (about $10^{-1}$ Torr), more specifically about $10^{-3}$ Torr.

By brazing under vacuum using Ti-containing activated silver brazing metal or brazing using silver brazing metal in the atmosphere after forming a coating of a Ti compound, it is possible to bond an ultra-high-pressure sintered compact insert to a tool body over the entire contact area. In contrast, when bonding an insert having a base metal layer, only the base metal is brazed to the tool body. Thus, provided the inserts have the same size, the tool according to the present invention has a larger joint area and thus higher bond strength between the insert and the tool body than a conventional tool.

Description is now made of the helical insert of ultra-high-pressure sintered compact according to the present invention and a method of manufacturing such an insert.

A block made solely of an ultra-high-pressure sintered compact and including no base metal layer is the least likely to develop cracks when forming an insert or subjecting the block to electrical discharge machining.

According to the present invention in which cylindrical or columnar insert materials are cut from such a block, it is possible to form a plurality of insert materials of the same or different kind and diameter from a single block. Forming a single block requires substantially the same trouble as forming a single insert material by direct sintering. Thus, if three insert materials are formed from a single block, they can be formed about three times more efficiently.

Also, according to the present invention, a plurality of helical inserts can be formed from each insert material. This further reduces the manufacturing cost per insert. The smaller the diameter of the inserts to be formed, the greater the number of inserts obtained from a single block. Thus, the advantage of the present invention will be felt more remarkably when forming small-diameter tools.

Since insert materials of any desired size can be cut from a block in any desired direction, design flexibility is increased according to the diameter of the tool formed, and the length and helix angle of its cutting edges.

Basically, insert materials are cut from a block in one of the three ways shown in FIGS. 8–10 (which we will discuss in more detail later). In any of these ways, a plurality of insert materials are obtainable from a single block.

A sintered compact (block) usually has a diameter two to three times larger than its height. If it is desired to form helical inserts having a long effective cutting edge length, insert materials should be cut in the manner shown in FIG. 8. For example, let us assume that an insert material 21 having a diameter d=16 mm is obtained by cutting a block 20 having a diameter θ=40 mm and a height of 16 mm as shown in FIG. 15 in the manner shown in FIG. 8. From this insert material 21, it is possible to form an insert having a maximum cutting edge length Lmax of $2\sqrt{(\theta/2)^2-2\sqrt{(d/2)^2}}=36.6$ mm.

In contrast, in the method disclosed in Unexamined Japanese Patent Publication 3-10707, the Lmax will be only 16 mm because it is restricted by the value t in FIG. 14. In the method shown in FIG. 15, the smaller the diameter d of the insert material, the larger the value L can be made. But in the arrangement shown in FIG. 14, considering the quality aspect of the tool formed, it is impossible to reduce only the diameter d. Namely, if the diameter d is small, the value t has to be correspondingly small. Thus, it is difficult to form a tool having sufficiently long cutting edges.

The cutting tool of the present invention is free of this problem. With the arrangement of the present invention, it is possible to form a cutting tool which is small in diameter but sufficiently large in effective length of its cutting edges.

Other features and objects of the present invention will become apparent from the following description made with reference to the accompanying drawings, in which:

DETAILED DESCRIPTION OF THE PREFERRED EMBODIMENT

Figure 1:
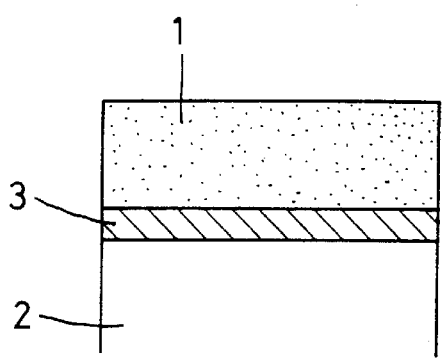
FIG. 1 is a view showing one method of manufacturing a cutting tool according to the present invention.
Figure 2:
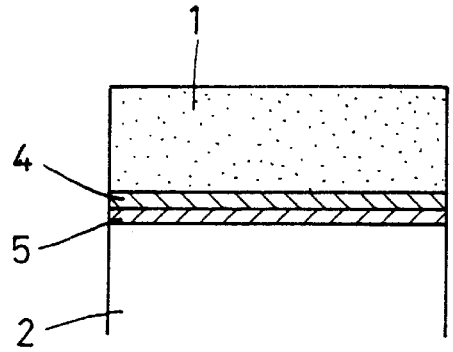
FIG. 2 is a view showing another method of manufacturing a cutting tool according to the present invention.
Figure 3:
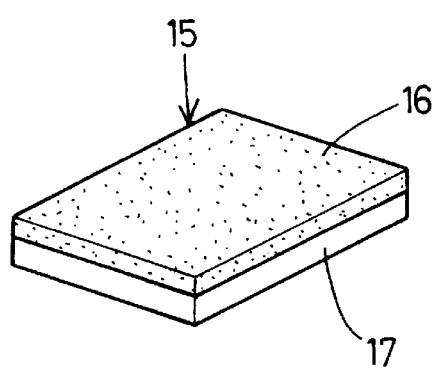
FIG. 3 is a perspective view of a conventional composite plate material for an ultra-high-pressure sintered compact insert.

FIGS. 1 and 2 show two basic forms of the rotary cutting tool according to the present invention. Numeral 1 in these figures indicates an insert formed solely from an ultra-high-pressure sintered compact or without a base metal layer. Numeral 2 indicates a tool body made of a cemented carbide.

In the embodiment of FIG. 1, the insert 1 made of an ultra-high-pressure sintered compact is brazed under vacuum to the tool body 2 through a bonding layer 3 of Ti-containing activated silver as a brazing metal.

In the embodiment shown in FIG. 2, the insert 1 of an ultra-high-pressure sintered compact is brazed to the tool body 2 by forming a coating 4 of TiC, TiN or TiCN formed on the insert 1 by PVD or CVD process and brazing in the atmosphere by use of an ordinary silver brazing metal with the coating as the bonding surface. Thus, the bond layer 5 of a brazing metal anchors rigidly to both the coating 4 and the tool body 2. The coating 4 should be formed only on the joint surface as shown. These methods can also be used when bonding a straight insert (without a base metal) of an ultra-high-pressure sintered compact directly to the tool body. Namely, the inserts 1 of an ultra-high-pressure sintered compact may be either a straight insert or a helical insert.

The insert formed from an ultra-high-presure sintered compact should have a thickness of not more than 2 mm and not less than 1 mm.

Figure 4B:
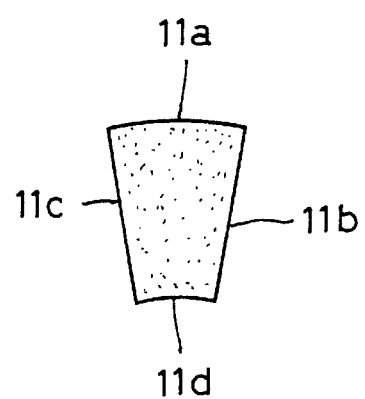
FIG. 4B is an end view of the same.
Figure 4A:
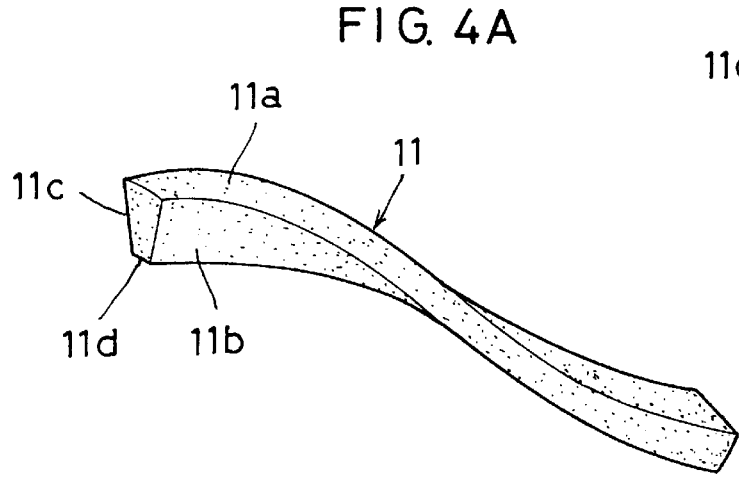
FIG. 4A is a perspective view of a helical insert of an ultra-high-pressure sintered compact used for a cutting tool according to the present invention.

FIGS. 4A, 4B show a typical helical insert formed from an ultra-high-pressure sintered compact and used for a rotary cutting tool according to the present invention. We will later describe the method of manufacturing helical inserts 11.

Figure 5A:
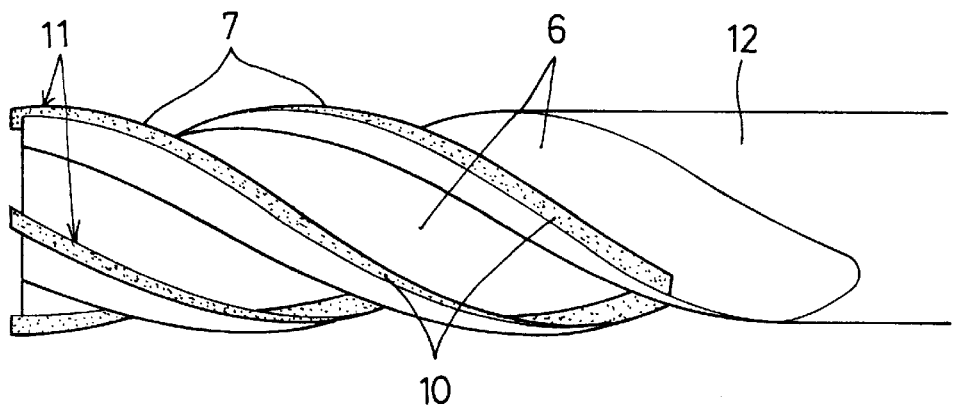
FIG. 5A is a side view of a rotary cutting tool (spiral end mill) according to the present invention.
Figure 5B:
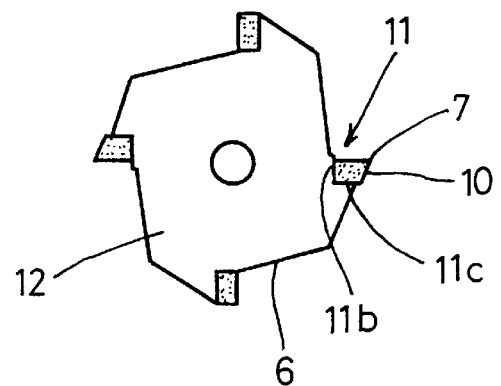
FIG. 5B is a front view of the same.

FIGS. 5A, 5B show a spiral end mill formed according to the method of the present invention, and having the helical inserts 11 shown in FIGS. 4A, 4B. Numeral 12 designates an end mill body (shank) having flutes 6 and cutting edges 7. If the end mill body 12 is formed from a cemented carbide, the flutes 6 are formed before sintering and the material is sintered to obtain a blank as the shank material. Then, helical inserts 11 of an ultra-high-pressure sintered compact are bonded to the respective flutes. If necessary, the inserts thus bonded are finish-machined to adjust their rake and clearance angles.

The helical inserts 11 may be bonded to the shank in either of the abovementioned two ways. They are bonded over the entire area of their surfaces 11c and 11c to the shank, so that the bond strength between the inserts and the shank is extremely high.

We will now describe in more detail the features of the rotary cutting tool having helical inserts of an ultra-high-pressure sintered compact according to the present invention.

Figure 6A:
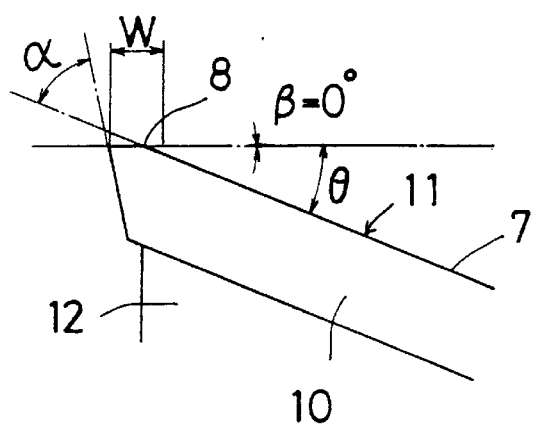
FIG. 6A is an enlarged developed side view of an encircled portion of FIG. 6B as viewed in the direction of arrow of FIG. 6B, showing a negative relief face formed at the tip of the helical insert having no circular land.

As shown in FIG. 6A, the larger the helix angle of a helical insert, the sharper the helix angle θ is at its tip. Thus, if such an insert 11 is made from a hard and brittle ultra-high-pressure sintered compact and has a large edge angle α, in order to prevent chipping at its pointed end, its axial rake β should be arranged so as to decrease to 0° or near 0° at its tip. According to the present invention, in order to reduce the axial rake to zero or near zero, the edge angle at the tip is blunted by providing a negative relief face 8 at its tip. In order for the end mill to fully perform its function, the width W of the negative relief face should be between 0.01 mm and 0.2 or 0.3 mm.

Figure 7A:
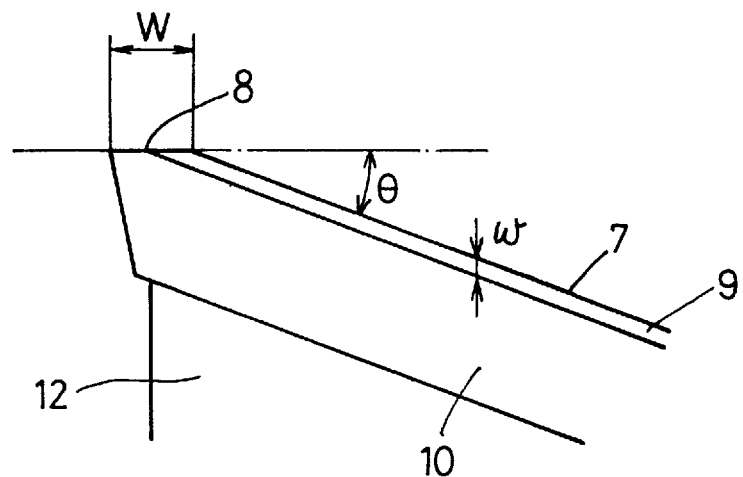
FIG. 7A is an enlarged developed side view of the tip of a helical insert of a cutting tool, showing how a circular land disappears at the tip of the insert by forming a negative relief face.
Figure 7B:
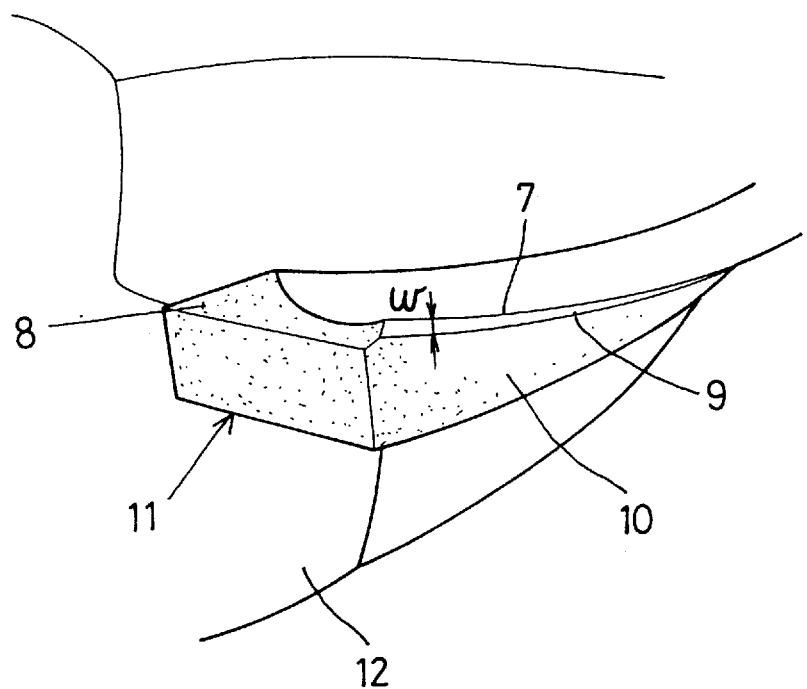
FIG. 7B is a perspective view of the portion of FIG. 7A as viewed from an obliquely forward direction of the tool.

As shown in FIGS. 7A, 7B, a circular land 9 (its width w is preferably 0.01–0.15 mm) may be provided along the cutting edge to strengthen the cutting edge and thus to improve the roughness of the finished surface.

In order to confirm the effect of the negative relief face and the circular land 9, we cut an Al alloy containing 1 wt % Si using end mills having a diameter of 8 mm and carrying four cutting edges having a helix angle θ=30 in an aqueous cutting solution under the following conditions: tool revolving speed=20000 rpm; feed F=1000 mm/min; and depth of cut d=0.05 mm.

Figure 6B:
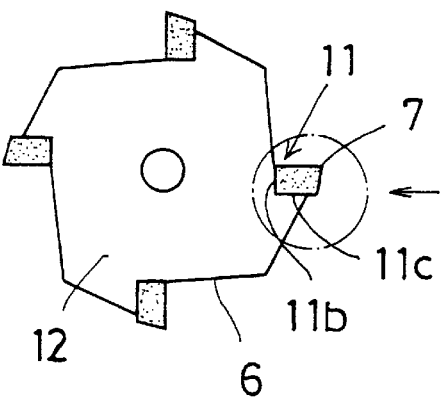
FIG. 6B is a view showing the portion shown in FIG. 6A.

After this cutting test, we found that an end mill having helical inserts made of a cemented carbide suffered no chippings at the edge tip even though these inserts had no negative relief faces as shown in FIGS. 6 and 7. However, the tips of the inserts wore out completely when the length of cut reached 100 m. In the case of an end mill having helical inserts made from polycrystalline diamond (sintered diamond) formed with no negative relief faces, the tips of the inserts chipped when the length of cut reached only 1–2 m. In contrast, the end mill whose inserts were formed from sintered diamond and had negative relief faces having a width W=0.03 mm did not chip even after cutting a workpiece having a length of 1000 m.

An end mill having negative relief faces 0.03 mm in width W and circular land 9 having a width w=0.03 mm suffered no chippings either at the tips of the cutting edges nor along their outer periphery even after cutting a workpiece of 1000 m. Also, the cut surface formed by this end mill was the smoothest.

FIGS. 6 and 7 merely show preferable arrangements for tools of this type. They are not essential features of the present invention.

Now returning to FIGS. 4A, 4B, we will describe the detailed structure of the helical insert 11.

The helical insert 11 has a top surface 11a that curves arcuately with a predetermined curvature as viewed from one end of the insert, and side faces 11b and 11c that extend helically with a predetermined helix angle. Its bottom surface 11d also curves arcuately as viewed from one end of the insert. But it may be flattened afterward according to the shape of the seating face. The insert 11 is made essentially from an ultra-high-pressure sintered compact. That is, it has no base metal layer.

Figure 8:
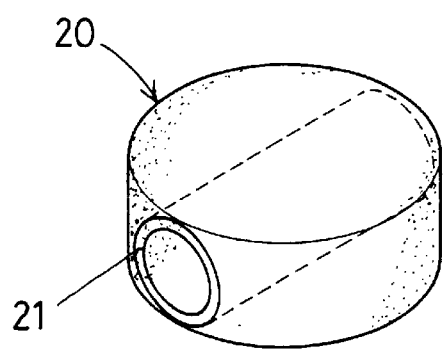
FIG. 8 is a view showing one way of cutting an insert material from a block of an ultra-high-pressure sintered compact.
Figure 9:
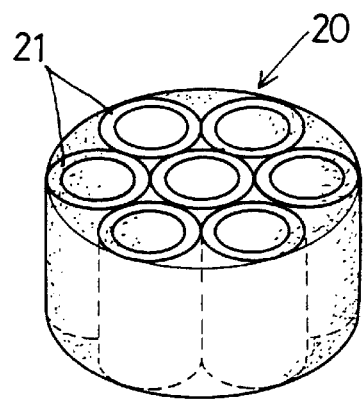
FIG. 9 is a view showing another way of cutting insert materials.
Figure 10:
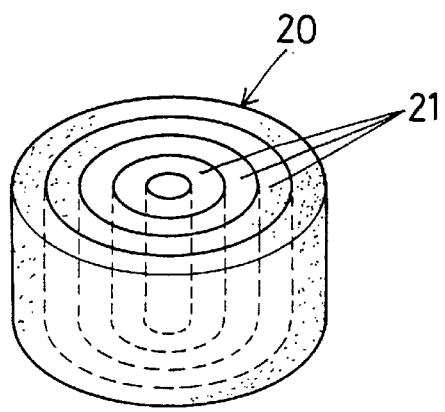
FIG. 10 shows still another way of cutting insert materials.

The helical insert 11 is formed as follows:

As shown in FIGS. 8–10, a block 20 of an ultra-high-pressure sintered compact is prepared. Cylindrical members 21 are formed by cutting the block 20 with an electrical discharge cutting wire. In FIG. 8 a material 21 is cut out from the block 20 so as to diametrically extend. In FIG. 9, materials 21 are cut out so as to extend vertically. If a tool having long cutting edges is needed, a cylindrical member should be formed in the manner shown in FIG. 8. If a tool having a large diameter is needed or if it is desired to cut as many cylindrical members as possible having the same diameter or different diameters from a single block, the cylindrical member or members should be formed in the manner shown in FIG. 9. In the example of FIG. 8, after cutting a single diametrically extending cylindrical member, it is possible to cut a plurality of additional members extending vertically or laterally and having different diameters or lengths from the remaining portion of the block on both sides of the first diametrically extending member.

When cutting vertically extending cylindrical members from the block, they may be cut concentrically as shown in FIG. 10. With this arrangement, material loss is zero. In the arrangement in FIG. 9, if it is desired to form as many cylindrical members as possible from a single block, one or more cylindrical members may be additionally formed concentrically inside each cylindrical member 21 shown.

Figure 11A:
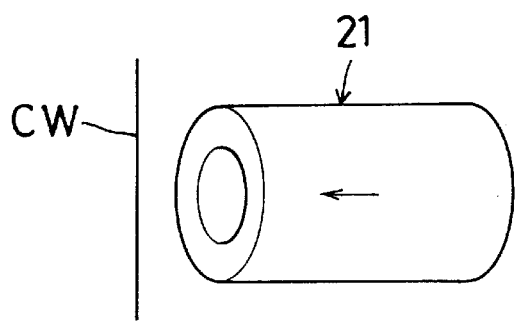
FIG. 11A is a view showing an initial step of cutting an insert from an insert material.
Figure 11B:
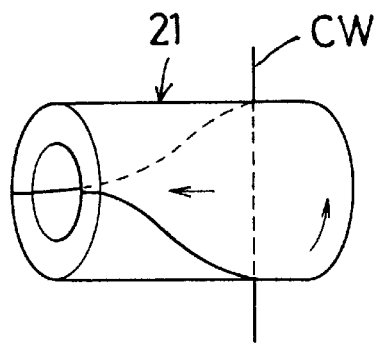
Fig. 11B is a view showing its intermediate step.

An electrical discharge cutting wire CW arranged opposite to one end face of a cylindrical member 21 as shown in FIG. 11A is pressed against the end face along its diametrical line, and advanced, while rotating the member about its axis at a predetermined constant speed, to its other end face as shown in FIG. 11B.

Figure 12:
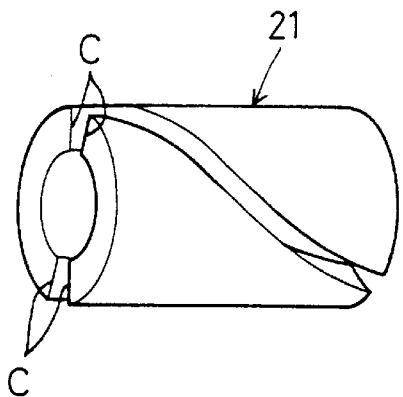
FIG. 12 is a perspective view showing the area formed into an insert.

At a slightly displaced position, the wire is fed through the member in the same manner as above to form a helical insert 11 of ultra-high-pressure sintered compact as shown in FIGS. 4. The hatched portion shown in FIG. 13 and defined between the cut faces C shown in FIG. 12 represents the insert 11.

Figure 13:
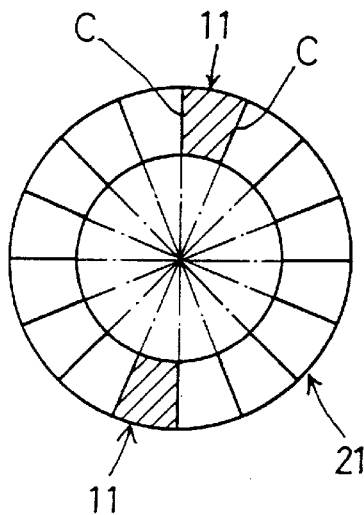
FIG. 13 is an end view showing the cut surfaces of the insert material.
Figure 14:
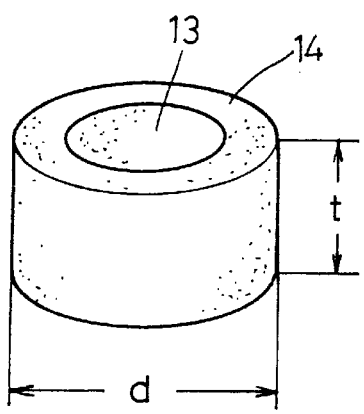
FIG. 14 is a perspective view of a conventional columnar insert material.
Figure 15:
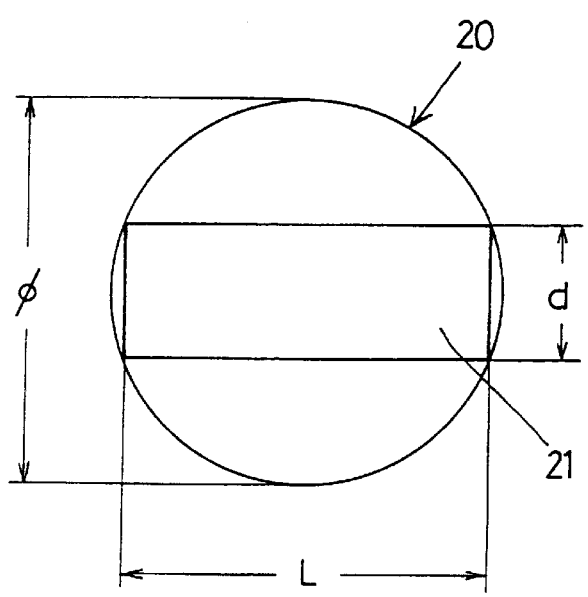
FIG. 15 is a view explaining the maximum length of an cylindrical insert material formed by cutting a block in a lateral direction.

To eliminate the waste of material, the cutting wire should be moved through the member so that the cut faces C that define the side faces 11b, 11c of the insert (FIG. 4) will intersect the axis of the cylindrical member 21 as shown in FIG. 13.

The helical inserts 11 thus formed are bonded to the flutes formed in a blank of a tool body. Then, if necessary, their rake and clearance angles are adjusted by a finish machining.

With this arrangement, cutting tools can be manufactured at low cost. By cutting a helical insert having helical surfaces whose lead angle is equal to the lead angle of the flutes 6 from a cylindrical member having the same diameter as the tool, the thickness of the insert remains substantially unchanged even after finishing it. Although the diameters of the cylindrical member and the tool may be different, such a difference should be as small as possible to minimize the amount of material removed by grinding the insert.

Inserts may be formed from a columnar member. By cutting such a columnar member so that the cut faces intersect the axis of the columnar member as shown in FIG. 13, an insert having a wedge-shape cross-section is obtained.

We compared the advantage of the method of the present invention over the following conventional methods A and B from an economical viewpoint in manufacturing a 4-edge end mill having a diameter of 10 mm. Table 1 shows the results of comparison.

Method A shown in the table is the method disclosed in Unexamined Japanese Patent Publication 3-10707, in which a layer of ultra-high-pressure sintered compact is formed around a base metal as a core to provide a cylindrical member, and the member is cut longitudinally along a helical cut line. Various jigs are used to apply pressure and temperature uniformly to the sintered compact when sintering it under ultra-high pressure. In order to maintain the ultra-high pressure and high temperature, the gaps of such jigs and the sintered compact have to be kept as small as possible. Also, in such ultra-high-pressure condition, the sintered compact tends to be deformed. In order to keep the gaps as small as possible and to prevent deformation of the sintered compact, a single sintered compact should be in principle formed by sintering the material only once. If two or more materials arranged in parallel to each other are sintered at a time, the yield tends to drop markedly. Thus, in Method A, only one cylindrical member was formed at a time.

On the other hand, Method B is the method disclosed in Unexamined Patent Publication 3-277412, in which helical grooves are formed in a sintered compact member as a substrate, a material of an ultra-high-pressure sintered compact is charged in the grooves, and the material is sintered and at the same time bonded to the substrate. In Method B, too, only one cylindrical member compact is formed at a time. Moreover, in this method, only one end mill can be formed from one sintered compact.

In contrast, in the method of the present invention, four cylindrical members 10.5 mm in diameter were obtained from a single block of ultra-high-pressure sintered compact. 16 helical inserts were formed from each cylindrical member.

In Methods A and B, different materials are sintered simultaneously, so that they tend to develop cracks during sintering. This leads to an increase in the number of defectives produced in the subsequent manufacturing steps and thus a lower yield. Of the two methods A and B, Method B was lower in yield than Method A, because the sintered compact used in Method B is complicated in shape and thus more likely to be deformed and produce greater number of defectives.

In the method of the present invention, the yield was 95%. Namely, an average of 15.2 end mills were obtained from one raw material. The manufacturing efficiency was about 5 times higher than in Method A and about 30 times higher than in Method B. As to the unit price of end products, considering the fact that the cost for final processing of a sintered compact accounts for about 50% of the total cost, such unit price will be approximately 2.5 times, in the case of Method A, and 1.5 times, in the case of Method B, the unit price of the end products produced according to the method of the present invention.

In this test, as the starting materials for the sintered compact, we used diamond powder containing 7% Co. The base metal and the substrate included in the materials in Methods A and B were formed from a cemented carbide comprising WC and 10% Co.

The ultra-high-pressure sintered compact used in the present invention may be one of the following:

a) Diamond sintered compact containing 80 volume % or more of diamond, the balance being carbides of one or more metals that belong to the IVa, Va and VIa groups of the periodic table, and/or ferrous metals, and inevitable impurities.

b) Cubic boron nitride sintered compact containing 40–80 volume % of cubic boron nitride, the balance being one or more than one selected from nitrides, carbides, borides of the elements that belong to the IVa, Va and VIa groups of the periodic table, and their solid solutions; aluminum compounds; and inevitable impurities.

c) Cubic boron nitride sintered compact containing 50–90 volume % of cubic boron nitride, the balance being one or more compound selected from borides and carbides of Co, W, aluminum nitrides, and aluminum borides, their solid solutions, and inevitable impurities.

Inevitable impurities herein referred to include e.g. alumina.

As described above, in the method of manufacturing tools according to the present invention, inserts made solely of hard sintered compact can be rigidly bonded to the tool body by brazing. Also, helical inserts of ultra- a high-pressure sintered compact can be manufactured at high yield. Also, the method of the present invention is free of the problems of low manufacturing efficiency of inserts, high production cost due to high tool machining cost, and low productivity. According to the method of the present invention, it is possible to manufacture a high-performance, high-precision, long-life, low-cost rotary cutting tool having cutting edges of ultra-high-pressure sintered compact.

The helical insert of ultra-high-pressure sintered compact according to the present invention is formed by cutting a cylindrical or a columnar member longitudinally along helical lines. Thus, its helix angle is not limited at all. In other words, its helix angle can be increased to any desired degree to improve its cutting ability.

Moreover, in the method of manufacturing inserts according to the present invention, a plurality of raw materials are cut from a single block. A plurality of helical inserts are obtained from each raw material by cutting it into a plurality of pieces. Compared to conventional methods in which only one insert is formed from a single material by sintering, the manufacturing efficiency improves several times and the yield is correspondingly high.

TABLE 1

|  | method of present invention | method A | method B |
|---|---|---|---|
| Number of cylindrical materials obtained by one sintering | 4 | 1 | 1 |
| Yield in sintering process | 95% | 70% | 50% |
| Number of helical inserts obtained from one material | 16 | 16 | 4 |
| Number of helical inserts obtained by one sintering | 64 | 16 | 4 |
| Number of end mills obtained per one sintering | 15.2 | 2.8 | 0.5 |
| Ratio of price of end mill | 1 | 2.5 | 15 |

What is claimed is:

1. A rotary cutting tool comprising:

a tool body having a plurality of flutes formed in an outer peripheral surface of said tool body; and a plurality of helical inserts secured to said tool body, each of said helical inserts consisting essentially of a body formed from an ultra-high-pressure sintered compact, wherein each of said plurality of helical inserts has a longitudinally extending cutting edge and a land extending along said cutting edge. said land having an outwardly curved contoured surface, and wherein each of said plurality of helical inserts is secured to said tool body through a bonding layer of Ti-containing activated silver brazing filler material.

2. A rotary cutting tool comprising:

a tool body having a plurality of flutes formed in an outer peripheral surface of said tool body; and a plurality of helical inserts secured to said tool body, each of said helical inserts consisting essentially of a body formed from an ultra-high-pressure sintered compact, wherein each of said plurality of helical inserts has a longitudinally extending cutting edge and a land extending along said cutting edge, said land having an outer contour in the shape of a part cylindrical surface, and wherein each of said plurality of helical inserts is secured to said tool body through a bonding layer of silver brazing filler metal disposed between a coating of a Ti compound, provided on a surface of said helical insert, and said tool body.

3. The rotary cutting tool as claimed in claim 2, wherein said Ti compound is selected from the group consisting of TiC, TiN and TiCN.

4. A method of manufacturing a rotary cutting tool, the method comprising:

forming a plurality of helical inserts consisting essentially of a body made from an ultra-high-pressure sintered compact;

placing said plurality of inserts and a tool body under a vacuum; and brazing, under said vacuum, said plurality of inserts to said tool body using Ti-containing activated silver brazing filler material at a temperature between 700 and 900 degrees centigrade.

5. A method of manufacturing a rotary cutting tool, the method comprising:

forming a plurality of helical inserts each having a land defining an outwardly curved contoured surface and consisting essentially of a body made from an ultra-high-pressure sintered compact;

coating bonding surfaces of each of said plurality of inserts with a Ti compound; and silver-brazing said plurality of inserts to a tool body under atmospheric conditions.

* * * * *